US012554629B2

(12) United States Patent
Singh et al.

(10) Patent No.: US 12,554,629 B2
(45) Date of Patent: Feb. 17, 2026

(54) SYSTEM AND METHOD FOR AUTOMATIC GENERATION AND AUTOMATIC CONDUCT OF A CHAOS EXPERIMENT IN DISTRIBUTED APPLICATIONS

(71) Applicant: Guardian Life Insurance Company of America, New York, NY (US)

(72) Inventors: Manas Singh, Chappaqua, NY (US); Daniel Johnson, Slingerlands, NY (US)

(73) Assignee: Guardian Life Insurance Company of America, New York, NY (US)

(*) Notice: Subject to any disclaimer, the term of this patent is extended or adjusted under 35 U.S.C. 154(b) by 154 days.

(21) Appl. No.: 18/403,270

(22) Filed: Jan. 3, 2024

(65) Prior Publication Data
US 2025/0217270 A1    Jul. 3, 2025

(51) Int. Cl.
  G06F 11/3668 (2025.01)
  G06N 7/08 (2006.01)
(52) U.S. Cl.
  CPC ...... G06F 11/3688 (2013.01); G06F 11/3692 (2013.01); G06N 7/08 (2013.01)
(58) Field of Classification Search
  None
  See application file for complete search history.

(56) References Cited

U.S. PATENT DOCUMENTS

| 11,356,324 B2* | 6/2022 | Gefen | ............. H04L 45/38 |
| 11,397,665 B2* | 7/2022 | Singh | ............. G06F 11/3698 |
| 11,755,451 B2 | 9/2023 | Doni et al. | |
| 2024/0385950 A1* | 11/2024 | Verma | ............. G06F 11/3684 |
| 2025/0053501 A1* | 2/2025 | Ayyadurai | ............. G06N 20/00 |
| 2025/0217270 A1* | 7/2025 | Singh | ............. G06F 11/3688 |

FOREIGN PATENT DOCUMENTS

CN        113342650 A       9/2021

OTHER PUBLICATIONS

Sarda, "Leveraging Large Language Models for Auto-remediation in Microservices Architecture", 2023, IEEE (Year: 2023).*

(Continued)

*Primary Examiner* — Hossain M Morshed
(74) *Attorney, Agent, or Firm* — Carter Ledyard & Milburn LLP

(57) ABSTRACT

A system and method for automatic generation and automatic conduct of a chaos experiment in distributed applications includes a software application having a layer and a chaos configuration, a chaos engine having a chaos orchestrator, a chaos prompt generator having a prompt template composer, and a chaos engineering large language model. The chaos engineering large language model is configured to recommend chaos experiments for the chaos engine to process and to inject into the software application. The chaos engineering large language model is also configured to patch the software application in accordance with objectives and parameters developed in the system and method. The system and method may be automated through a trigger. The trigger may be the chaos engineering large language model recommending one or more chaos experiments to the chaos engine. The trigger may also be the implementation of one or more patches to the software application.

17 Claims, 10 Drawing Sheets

(56) References Cited

OTHER PUBLICATIONS

Akuthota, "Chaos Engineering for Microservices", 2023, St. Cloud State University (Year: 2023).*

Kazuyuki Aihara, Chaos Engineering and Its Application to Parallel Distributed Processing With Chaotic Neural Networks, Proceedings of the IEEE (vol. 90, No. 5, May 2002), pp. 919-930, IEEE, United States.

Gremlin, Chaos Engineering, https://www.gremlin.com/chaos-engineering/, Covina, California, United States.

Trieu C. Chieu et al., Automation System for Validation of Configuration and Security Compliance in Managed Cloud Services, 2012 Ninth IEEE International Conference on e-Business Engineering, 2012, pp. 285-291, DOI 10.1109/ICEBE.2012.53, IEEE Computer Society, United States.

Kennedy A. Torkura et al., CloudStrike: Chaos Engineering for Security and Resiliency in Cloud Infrastructure, IEEE Access, 2020, pp. 123044-123060, vol. 8, DOI 10.1109, IEEE, United States.

Gremlin, Chaos Engineering Adoption Guide, https://www.google.com/url?sa=t&rct=j&q=&esrc=s&source=web&cd=&ved=2ahUKEwju76eHsPKDAxXvCnkGHcLxB1cQFnoECBAQAQ&url=https%3A%2F%2Fres.cloudinary.com%2Fgremlin%2Fimage%2Fupload%2Fv1589382890%2FWhite%2520Papers%2FGremlin_Chaos_Engineering_Adoption_Guide.pdf&usg=AOvVaw0JNrCoWeZjCWoJ6JXdCwO5&opi=89978449, 2023, pp. 1-23, Gremlin, United States.

Haley Tucker et al., The Business Case for Chaos Engineering, IEEEE Cloud Computing, May/Jun. 2018, pp. 45-54, 2325-6095/18, IEEE CS and IEEE ComSoc, United States.

* cited by examiner

```
application_id: 1
title: customerhub
date: 09/06/23
line_of_business: devops
owner: John Doe
multi_tenant: true
encryption: aes # enum: none, des, rsa, aes, ecc
confidentiality: confidential # enum: public, internal, confidential
integrity: critical # enum: operational, important, critical
availability: critical # enum: operational, important, critical
business_criticality: operational # enum: operational, important, critical
externally_facing: true
contains_phi: true
contains_pii: true
compliance:
  - gdpr
  - hipaa
  - pci-dss
base_chaos_experiments:
  - latency-injection
  - service-restart
  - delayed-job-processing
  - traffic-spikes
  - database-failures
```

Figure 4

```
application_id: 1
sla: critical # enum: operational, important, critical
platform: linux # enum: linux, windows
version: ubuntu_lts
workload_type: container # enum: virtual, container, serverless
image: amazonlinux:latest
arch: amd64 # enum: amd64, arm64
deployment_frequency: daily # enum: daily, weekly, monthly, yearly
cloud_type: aws # enum: aws, gcp, azure, on-prem
deployment_platform: eks # enum: ecs, eks, lambda, server
target_services:
  - aws:s3
  - aws:ec2
  - aws:rds
  - aws:eks
  - aws:lambda
  - aws:apigateway
resources:
  - cpu: 16
    memory: 1024
base_chaos_experiments:
  - network-failure
  - dns-disruption
  - storage-failure
  - sidecar-disruption
  - resource-exhaustion
```

Figure 5

```
{
    "title": "What is the impact of an unexpected service failure?",
    "description": "If a service failure occurs, we should do a graceful restore.",
    "steady-state-theory": [
        {
            "type": "action",
            "name": "scale-down-deployment",
            "command": "kubectl scale deployment restart --replicas=2"
        },
        {
            "type": "action",
            "name": "delete-service",
            "command": "kubectl delete customerhub"
        },
        {
            "type": "healthcheck",
            "name": "establish-stability",
            "command": "curl https://uat.customerhub.glic.com/healthz",
            "delay": "5s",
            "timeout": "20s"
        }
    ],
    "rollbacks": [
        {
            "ref": "establish-stability",
            "on": "failure",
            "name": "restart service",
            "command": "kubectl apply -f customerhub-service.yaml"
        }
    ],
    "tags": ["k8s", "python"]
}
```

Figure 7

```
{
    "id": 1,
    "title": "customerhub",
    "owner": "John Doe",
    "status": "completed",
    "reliability_score": 9.82,
    "deviated": false,
    "results": {
        "scale-down-deployment": "success",
        "delete-service": "success",
        "establish-stability": "success"
    },
    "rollbacks": false,
    "executed_from": "EC2 <i-02e8bfg12b9ce696b>",
    "duration": 158.014,
    "completed_on": "Mon, 12 Sep 2023 14:02:40 GMT",
    "compliance": ["gdpr", "hipaa", "pci-dss"]
}
```

Figure 8

SYSTEM AND METHOD FOR AUTOMATIC GENERATION AND AUTOMATIC CONDUCT OF A CHAOS EXPERIMENT IN DISTRIBUTED APPLICATIONS

TECHNICAL FIELD

This disclosure relates to automating the generation and conduct of a chaos experiment in distributed applications.

BACKGROUND

Distributed applications typically deliver critical services and to businesses and consumers. The availability and performance of distributed applications is therefore critical for business operations and consumer experience.

Prior to this disclosure, traditional security measures included chaos engineering, which is a systematic and controlled approach for testing and improving the resilience and fault tolerance of a distributed applications system. For instance, chaos engineering may include deliberately injecting disruptions or failures into the distributed applications system, followed by observing and measuring the results of the chaos on the distributed applications. Any measured vulnerabilities and weaknesses following the injection would then be manually attended to.

Current, manual procedures for fixing vulnerabilities and weaknesses uncovered after a chaos engineering episode are subpar. These procedures typically have, among other things, limited coverage of failure scenarios, lack the entire context of an application, are significantly time-consuming, and are susceptible to errors resulting from complex deployments and complex software architectures.

It is therefore desirable to develop a system and method that incorporates automatic generation and automatic conduct of a chaos experiment in distributed applications. The system and method would enable more efficient chaos engineering exercises, followed by more efficient means to resolve vulnerabilities and weaknesses uncovered from those exercises.

SUMMARY OF THE DISCLOSURE

In one implementation, a system for automatically generating and conducting a chaos experiment in distributed applications includes a software application comprising a layer and a chaos configuration. The chaos configuration may include application information stemming from the layer or the application as a whole. The system may include a chaos engine comprising a chaos orchestrator. The chaos orchestrator may be configured to generate the chaos experiment, receive the application information, read the application information, inject the chaos experiment into the application, obtain results of the chaos experiment, and generate a report of the results of the chaos experiment. The chaos experiment may include a disruption to an application. The system may include a chaos prompt generator having a prompt template composer. The chaos prompt generator may be configured to read the report of the results of the chaos experiment as well as compose a chaos prompt. The system may include a chaos engineering large language model. The chaos engineering large language model may be configured to exchange queries and trainings via the chaos prompt, generate a chaos bot that is capable of recommending an additional chaos experiment to the chaos engine and patching the chaos configuration. The chaos large language model may generate comprehensive chaos artifacts automatically while concurrently training itself. The chaos bot may be in the form of one or more documents, data, or code.

One or more of the following features may be included. The system may include the software application further comprising an application profile, a software template, and a workload context. The system may include the chaos engine further comprising a chaos configuration composer configured to compose an updated chaos configuration based on a recommendation provided by the chaos bot. The system may include an application programming interface configured to receive modifications of the chaos orchestrator and send a summary of a result of the modification. The system may include the chaos engine further comprising a reliability rating generator configured to generate a reliability rating of the software application. The system may include the chaos engine having a rollback controller and an alert manager. The system may include the chaos prompt generator further comprising a prompt generation pipeline configured to test and generate the chaos prompt. The system may include the chaos prompt generator further comprising a chaos prompt template that is capable of being modified by the prompt template composer. The chaos prompt template may include information pertaining to identified chaos scenarios, fault injection steps and sequences, rollback steps, and a reliability index associated with the system. The system may include the chaos prompt generator further comprising a chaos data annotator capable of annotating the results of the chaos experiment. The system may include the chaos engineering large language model being configured to generate a test policy, an application chaos template, and a workload chaos template. The test policy, application chaos template, and workload chaos template may then be exchanged with the chaos engine and the software application for developing additional chaos experiments and patches.

In another implementation, a method for automatically generating and conducting a chaos experiment in distributed applications includes providing a software application having at least one layer and at least one chaos configuration, wherein the chaos configuration comprises application information; providing a chaos orchestrator; creating the chaos experiment via the chaos orchestrator; providing a chaos prompt generator having a prompt template composer; providing a chaos engineering large language model configured to generate a chaos bot; starting the chaos experiment for the software application; exchanging the chaos configuration with the chaos engine; injecting the chaos experiment into the software application; exchanging the results of the chaos experiment with the chaos prompt generator; generating one or more chaos prompts; querying and training the chaos engineering large language model with the prompt template; developing a second chaos experiment and patches via the chaos engineering large language model; recommending the second chaos experiment in the chaos orchestrator; patching the software application via the chaos bot.

One or more of the following features may be included. A software chaos configuration, an application chaos configuration, and a workload chaos configuration may be included within the application. A chaos template repository configured to store a premade chaos prompt and a chaos prompt generated by the chaos prompt generator. A step of annotating the one or more chaos prompts may be included. Modifying the chaos orchestrator based on a recommended chaos experiment provided by the chaos bot may be included. Generating a reliability score may be included. Generating a test policy, an application chaos template, and a workload chaos template may be included.

The details of one or more implementations are set forth in the accompanying drawings and the description below. Other features and advantages will become apparent from the description, the drawings, and the claims.

BRIEF DESCRIPTION OF THE DRAWINGS

Various embodiments in accordance with the present disclosure will be described with reference to the drawings, in which:

FIG. 4 illustrates an example of an application profile.

FIG. 5 illustrates an example of a software template.

FIG. 7 illustrates an example of a chaos experiment.

FIG. 8 illustrates an example of a report of results of a chaos experiment.

DETAILED DESCRIPTION OF THE PREFERRED EMBODIMENTS

Figure 1:
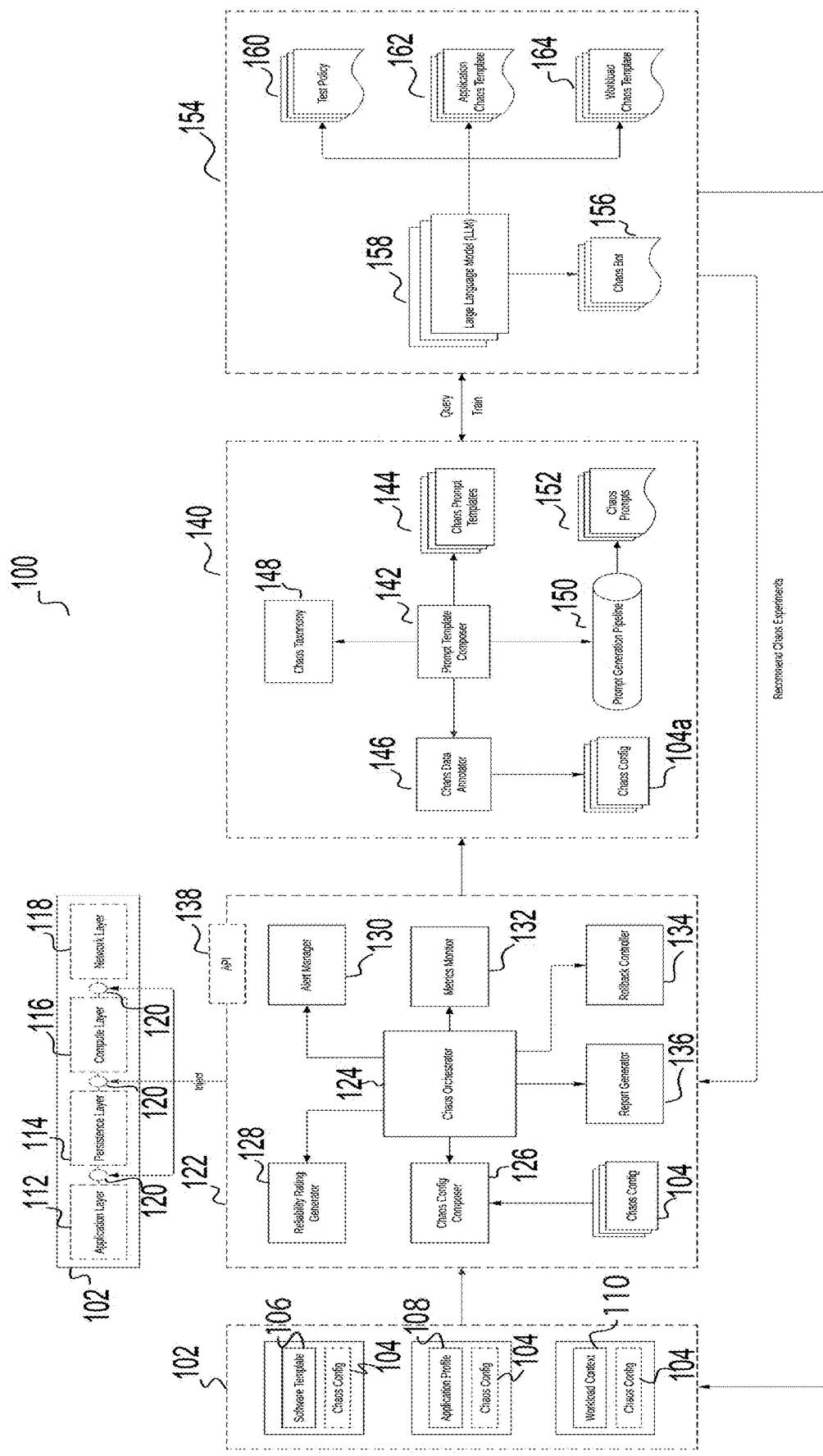
FIG. 1 illustrates an example of a system for automatically generating and conducting a chaos experiment in distributed applications.

Referring to FIG. 1, there is shown an example of a system for automatically generating and conducting a chaos experiment in distributed applications 100. A software application 102 may have multiple components each having a chaos configuration 104. For example, the components may include a software template 106, an application profile 108, and a workload context 110. Software template 106 may be a configuration file which defines properties and characteristics of software application 102, including language, software framework, etc. Software template 106 may also be a document which contains and defines information about the functionality of software application 102. Application profile 108 may contain various attributes and properties which describe different aspects of an application, including compliance attributes, encryption properties, and criticality of certain application information. Workload context 110 may include an outline of details about the environment in which software application 102 is deployed. Workload context 110 may also include specifics of the workload for software application 102, such as workload type (e.g., static workloads versus dynamic workloads), architecture, services used, cloud resource capacities, and cloud resource allocation. Chaos configuration 104 may contain traits of software application 102 that are susceptible to software-related failures. That is, information of chaos configuration 104 may communicate the structure or configuration of its security features. Chaos configuration 104, for example, may include information for authentication mechanisms, access controls, encryption methods, and security protocols. Chaos configuration 104 may also include application information.

Software application 102 may also have one or more layers. An example of a layer may be a logical separation of components or code within the structure of software application. For instance, software application 102 may have an application layer 112, a persistence layer 114, a compute layer 116, and a network layer 118. Application layer 112 may include components or code which handle application functions. Persistence layer 114 may include components or code for storing and retrieving data. The persistence layer 114 may hold code that enables manipulation of a database, such as connection details. Compute layer 116 may be responsible for task executions and computations. Compute layer 116 may handle the processing power required to run applications, execute queries, perform computations, and manage data. For instance, in a cloud-based data platform, the compute layer handles the execution of queries using virtual warehouses (e.g., compute clusters with multiple compute nodes). Network layer 118 may manage device addressing, device location in a network, and data routing. Key functions of network layer 118 may include packet forwarding, host addressing, message forwarding, and fragmentation of internet protocol packets. Each of layers 112, 114, 116, and 118 may have one or more dependencies 120 between them. The one or more dependencies 120 may be configured for dependency injections, in which one or more of the layers receive other objects or functions from an external, injecting source.

An exemplary injecting source may include a chaos engine 122. Chaos engine 122 may include a chaos orchestrator 124 and be configured to generate a chaos experiment, receive application information and/or at least one chaos configuration 104, read application information and/or at least one chaos configuration 104, inject the chaos experiment into software application 102, obtain results of the chaos experiment, and generate a report of the results of the chaos experiment. Chaos engine 122, with aid from chaos orchestrator 124, may be configured to generate a chaos experiment. For instance, chaos engine 122 may generate the chaos experiment for testing on software application 102. The chaos experiment may be designed to test how software application 102 behaves under stress or failure conditions (e.g., network latency, pod termination, function errors, etc.). Chaos orchestrator 124 may be a tool of chaos engine 122 to create, manage, and run chaos experiments. Chaos engine 122 may also be configured to receive application information of software application 102, including chaos configuration 104, software template 106, application profile 108, and workload context 110. Chaos engine 122 may, for example, employ chaos orchestrator 124 to read the application information. Chaos engine 122 may also possess other means of reading the application information (e.g., reading input, or processing metadata, or acting on data provided by chaos configuration 104). Chaos engine 122 may additionally receive application information of chaos configuration 104 via a chaos configuration composer 126 reading chaos configuration 104 and composing another configuration (not shown) that is readable by chaos orchestrator 124. If there is more than one chaos configuration 104 coming from multiple components of software application 102 (e.g., software template 106, application profile 108, and workload context 110), chaos configuration composer 126 may read multiple chaos configurations and compose a single configuration for reading by chaos orchestrator 124. Chaos orchestrator 124 may generate a chaos experiment following (1) reading of a configuration file composed by chaos configuration composer 126 (the configuration file typically contains the parameters and specifications for a chaos experiment); (2) parsing of the configuration file to understand the type of chaos experiment to be conducted, the target system, and the specific parameters for chaos injection; and (3) based on the parsed configuration, generate the chaos experiment (e.g., creating a sequence of chaos faults that are arranged in a specific order to create a failure scenario. Chaos faults may target various aspects of software application 102, including constituent parts underlying software application 102). Chaos orchestrator 124 may, following readings of information provided by chaos config composer 126, inject a generated chaos experiment into software application 102 in a controlled manner. Chaos engine 122 may then monitor behavior of software application 102 during the chaos experiment and validate whether software application 102 behavior matches an expected outcome. Chaos engine 122 may monitor and validate through a reliability rating generator 128, which would take various factors such as error rates, latency, and other performance metrics to generate a reliability rating, or a score, that reflects the overall reliability of software application 102. Reliability rating generator 128 may evaluate several key factors pertaining to software application 102 and calculate how quickly software application 102 recovers from faults during the chaos experiment. Chaos engine 122 may further monitor the chaos experiment with an alert manager 130 configured to handle alerts generated during the chaos experiment. Alert manager 130 may receive alerts from monitoring capabilities of chaos engine 122 that are triggered when certain, predefined conditions are met during the chaos experiment. Alert manager 130 may filter these alerts based on their importance and urgency, group alerts to reduce noise, route alerts to appropriate personnel or appropriate components of system 100, suppress non-critical alerts to avoid alert fatigue, escalate certain alerts, and/or analyze alerts after the chaos experiment. A metrics monitor 132 may be included in chaos engine 122. Metrics monitor 132 may collect, process, and display metrics and performance data of various software application 102 components. Metrics monitor 132 may also enable chaos engine 122 to obtain results of the chaos experiment. Tools for metrics monitor 132 may include a monitoring and alerting toolkit; an observability platform for visualizing metrics, logs, and traces collected from software application 102; and a cloud-based monitoring and analytics platform for providing real-time insights of software application 102.

To ensure that software application 102 not lose any data or, worse, fail or shut down completely following the chaos experiment, a rollback controller 134 may be included with chaos engine 122. Rollback controller 134 may be responsible for managing a process of reverting software application 102 or system 100 back to a previous, stable state in the event of failure during the chaos experiment. Rollback controller 134 may also ensure that either all changes are made successfully to software application 102, or none are, in order to maintain consistency of system 100 or software application 102.

Chaos engine 122 may include a report generator 136 configured to generate one or more reports summarizing outcomes and observations of the chaos experiment. Report generator 136 may collect data from the chaos experiment. This data may include metrics, logs, and other information that was recorded during the chaos experiment. The data might be stored in various formats such as log files, database tables, or JSON files. Report generator 136 may use a programming language, such as Python or R, for data processing; a database system like SQL or MongoDB for data storage, and a reporting tool like LaTeX or Markdown for report generation.

Chaos Engine 122 may include an application programming interface ("API") 138 configured to receive modifications of chaos orchestrator 124 and to send a summary of the modifications' results. An endpoint which can receive requests containing the modifications may be included in the API. For instance, the endpoint could be a POST or PUT request that includes details of the modifications. API 138 may also be configured to apply the modifications. The results of the modifications may be in the form of a JSON object that includes summary details. If any errors occur while applying the modifications or generating the summary, API 138 may handle these errors and include details about them in the response.

Following the chaos experiment, chaos engine 122 may exchange the results of the chaos experiment and the report of the results of the chaos experiment with chaos prompt generator 140. Chaos prompt generator 140 may be configured to read the report of the results of the chaos experiment from chaos engine 122 and to, ultimately, compose a chaos prompt (marked with 152). A chaos prompt may be an input (e.g., text, code, etc.) to direct a large language model toward a particular outcome pertinent to chaos engineering and system 100. Chaos prompt generator may include a prompt template composer 142 configured to compose chaos prompt templates 144 in the context of information provided by chaos engine 122. Chaos prompt templates 144 may be structured formats or frameworks for creating specific chaos prompts 152. Prompt template composer 142 may be able to modify chaos prompt templates 144 in an iterative fashion. That is, prompt template composer 142 may frequently receive information from chaos engine 122 over a period of time, and any additional or modified information from chaos engine 122, as compared to previous information sent by chaos engine 122, would be considered by prompt template composer 142. Prompt template composer 142 may function, for instance, by receiving information from chaos engine 122 in various formats (e.g., JSON, XML, plain text, etc.); processing the information via parsing, extracting, and organizational means; generating text while involving use of templates, rules, and/or machine learning algorithms to convert the data into one or more chaos prompts 152. Prompt template composer 142 may employ annotation and/or labelling functions onto the information provided by chaos engine 122 via a chaos data annotator 146. Chaos data annotator 146 may label or tag data with relevant information surrounding chaos engineering of system 100 to prepare high-quality training data for machine learning-based artificial intelligence models. Prompt template composer 142 may obtain a framework for categorizing and organizing chaos-engineering concepts via chaos taxonomy 148. Chaos taxonomy 148 may include codified lists of principles which define chaos engineering views.

Chaos data annotator 146 is capable of generating a modified chaos configuration 104a when chaos prompt generator 140 receives modifications of chaos configuration 104. Chaos engine 122 may provide modifications or updates of chaos configuration 104 when acting on recommended chaos experiments provided by a chaos engineering large language model ("LLM") 154 and a chaos bot 156. Chaos configuration composer 126 may be configured to compose a modified or updated chaos configuration (i.e., a chaos configuration different from chaos configuration 104) based on a recommendation provided by chaos bot 156. Chaos bot 156 may be in the form of one or more readable documents containing chaos experiment recommendations and/or patching recommendations. Details of how chaos engineering LLM 154 and chaos bot 156 provide one or more recommendations will be further described below.

Chaos prompt generator 140 may include a prompt generation pipeline 150 configured to test and generate one or more chaos prompts 152. Prompt generation pipeline may be initiated by a trigger from prompt template composer 142. The trigger may be when prompt template composer completes composing a prompt. The trigger may also be a user-initiated request. Prompt template composer 142 may also provide context to prompt generation pipeline 150 with information from chaos configuration 104a, chaos data annotator 146, chaos taxonomy 148, and chaos prompt templates 144. Prompt generation pipeline 150 may receive a task-specific objective and constraints from prompt template composer 142 or from a user of the system. Prompt template composer may further provide query phrasing and/or iterative refinement of prompts to prompt generation pipeline 150. Prompt generation pipeline 150 may contain functionalities for continuous exploration, continuous integration, continuous deployment, release on demand, build automation, test automation, and deployment automation. Such functionalities contribute to prompt generation pipeline being able to test and generate one or more chaos prompts 152.

After prompt generation pipeline 150 refines prompts from prompt template composer 142, prompt generation pipeline 150 may output one or more chaos prompts 152 in the form of readable documents.

One or more chaos prompts 152 may then be exchanged with chaos engineering LLM 154 through a query or through a training process. That is, chaos engineering LLM 154 may receive chaos prompts 152 as well as send text information, also in the form of a query or training process, to chaos prompt generator 140 to further refine chaos prompts 152. Through querying and training processes, large language model 158 may possess a sufficient number of prompts and context to generate one or more chaos bots 156.

Large language model 158 may be a type of language model that is capable of generating natural language and/or code and/or other readable text following input of a prompt (e.g., one or more chaos prompts 152). Large language model 158 may generate artifacts which can be used in a chaos engineering environment with little to no experimentation. The extent of modifications to such artifacts are preferably kept to a minimum so as to automate system 100. Large language model 158 may be capable of producing outputs that can be read by components of system 100 and other similar chaos engineering systems without resort to additional inputs, encoding, and/or decoding.

One or more chaos bots 156 generated by large language model 158 may enable chaos engineering LLM 154 to recommend one or more additional chaos experiments to chaos engine 122. Chaos engine 122 may then automatically process the one or more additional chaos experiments and apply the experiment(s) to software application 102 following chaos engine's 122 receipt of chaos engineering LLM's 154 recommendation(s). The recommendation(s) by chaos engineering LLM 154 may cause chaos engine 122 to adopt a new chaos configuration based on modified chaos configuration 104a. By automatically triggering chaos engine 122 to initiate another chaos experiment onto software application 102, system 100 may include a continuously running, ever-improving chaos engineering environment for the purpose of building sustainable, failure-proof distributed applications.

Chaos engineering LLM 154 recommendations may be influenced by information and/or context provided by reliability rating generator 128. At least a portion of one or more chaos bots 156 may be directed to patching software application 102. The patches may either be automatically applied to software application 102 or manually inserted by an administrator of system 100. [explain how chaos engineering LLM 154 recommends chaos experiments, recommends patches, and how the whole thing is automated by a trigger in which the recommendations are triggers and items are therefore repeated and updated accordingly; e.g., chaos engineering LLM 154 can trigger an automatic process in system 100 by generating natural language expressions that can be interpreted as instructions or prompts for subsequent actions. For instance, chaos engineering LLM 154 may adapt to new information without having to change the model architecture or retrain, which may make chaos engineering LLM 154 particularly useful for real-time recommendation systems. Chaos engineering LLM 154 may also generate explanations in natural language for justifying specific recommendations, increasing the transparency of chaos engineering LLM 154.

Chaos engineering LLM 154 may also be configured to generate a test policy 160, an application chaos template 162, and/or a workload chaos template 164. These components may be included in developing one or more recommendations and/or one or more patching frameworks. Test policy 160 may be a high-level document which outlines at least one objective and/or at least one approach for chaos-engineering activities. Key components of test policy 160 may include business values delivered to an organization administering system 100; objectives directed to defect detection and reducing quality risks; maintaining a desired efficiency in testing; summarizing processes used in testing; and developing ways to enhance testing. Test policy 160 may be formulated by chaos engineering LLM to develop a new chaos configuration for chaos engine 122. Application chaos template 162 may be one or more documents containing a predefined set of conditions or disruptions that are designed to be introduced into software application 102 and/or chaos engine 122 to test resilience and reliability of software application 102. Application chaos template 162 may be designed to simulate real-world conditions that could potentially affect software application's 102 performance. Workload chaos template 164 may contain one or documents having a predefined set of conditions or disruptions that are introduced into software application's 102 workload to test its resilience and reliability. Workload chaos template 164 may be designed to simulate real-world conditions that could potentially affect workload performance. Workload chaos template 164 may be used to develop or aid in the development of chaos experiments for chaos engine 122 to inject into software application 102. Test policy 160, application chaos template 162, and workload chaos template 164 may each be following subsequent queries and/or training processes between chaos prompt generator 140 and chaos engineering LLM 154.

Chaos engineering LLM's 154 functions may be automated to the extent that recommendations therefrom are automatically sent to chaos engine 122 to initiate a continuously-running cycle between chaos engine 122, chaos prompt generator 140, and chaos engineering LLM 154 for developing chaos experiments via the development and refinement of chaos prompts, chaos configurations, and chaos bots. Chaos engineering LLM's 154 may also automatically send information for patching software application 102 pursuant to objectives and constraints outlined by chaos engineering LLM 154.

Figure 2:
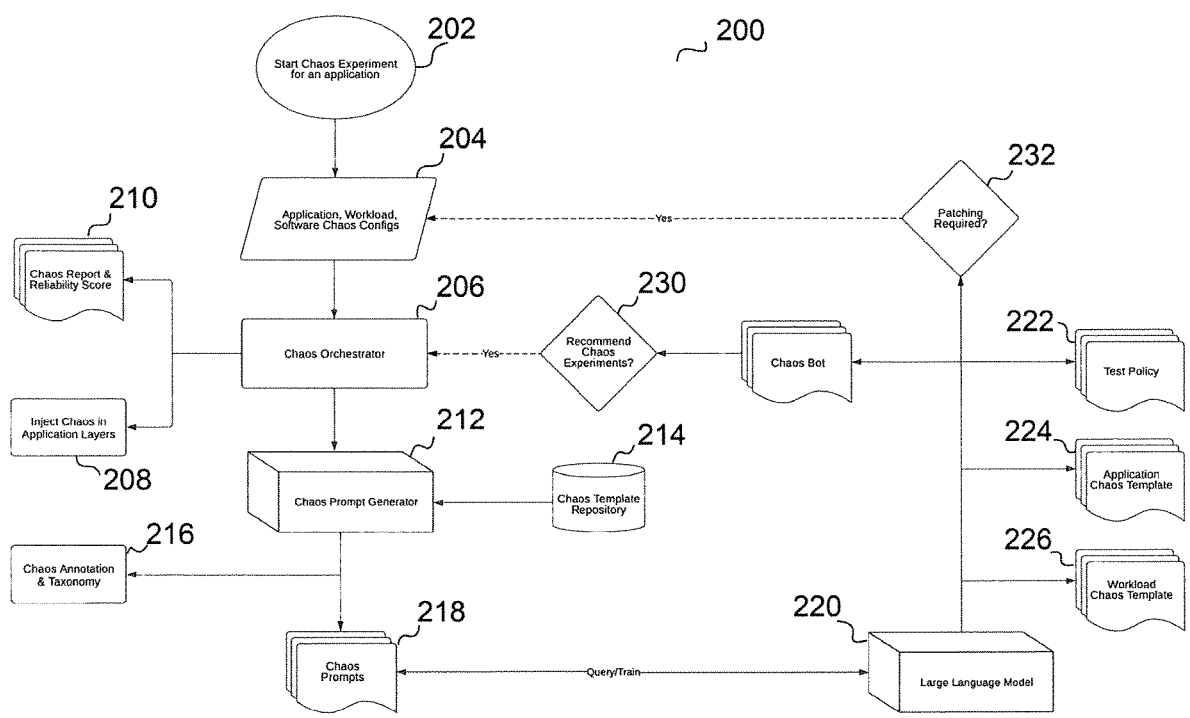
FIG. 2 illustrates an example of a method for automatically generating and conducting a chaos experiment in distributed applications.

Referring to FIG. 2, there is shown an example of a method 200 for automatically generating and conducting a chaos experiment in distributed applications. Method 200 may include providing an application comprising at least one layer and a chaos configuration having application information (akin to software application 102 shown in FIG.

1). Method 200 may also include providing a chaos orchestrator, a chaos prompt generator, and a chaos engineering large language model configured to generate a chaos bot (akin to one or more of chaos bots 156 in FIG. 1). A chaos experiment may be initiated on such an application (numeral 202) in method 200. One or more chaos configurations of the application may be inputted into method 200. One or more chaos configurations may be chaos configurations from the application itself, the application's workload, and/or the application's software components (numeral 204). The one or more chaos configurations may be outputted to a chaos orchestrator (numeral 206). The chaos orchestrator may resemble chaos orchestrator 124 shown and discussed from FIG. 1 as well as operate in a similar manner thereto. The chaos orchestrator may be configured to generate a chaos experiment, receive application information and/or at least one chaos configuration, read application information and/or at least one chaos configuration, inject the chaos experiment into the application, obtain results of the chaos experiment, and generate a report of the results of the chaos experiment. The chaos orchestrator, for instance, may inject the chaos experiment into one or more layers of the application (numeral 208) and generate documents containing one or more chaos reports and one or more reliability scores (numeral 210) based off of the chaos experiment. The reliability score may reflect the reliability of the application in light of the chaos experiment and the application's behavior in response to the chaos experiment. The generation of a chaos report and a reliability score may occur before step 208 is performed (in which case, the report and the score may be based on the state of the application as is) or after 208 is performed (in which case, the reports and scores may be based on the behavior of the application during and after the chaos experiment is performed).

The chaos orchestrator may then exchange its contents, including documents generated in step 210, to a chaos prompt generator (numeral 212). The chaos prompt generator may generate one or more chaos prompts (numeral 218) as large language model-readable documents. A large language model may receive one or more chaos prompts as input (numeral 220) in the form of a query or a training trigger. The large language model may also send a query or a training trigger to the one or more chaos prompts and wait for the chaos prompt generator to add information relevant to the query or training trigger and then act on the added-to chaos prompt(s).

As the chaos prompt generator generates chaos prompts, the chaos prompt generator may, before generating the chaos prompts, obtain a premade prompt or template of prompts (numeral 214), the premade prompt being based on chaos engineering best practices, to either generate as a chaos prompt to be read by the large language model, or use the premade prompt to create another chaos prompt based on information provided by the chaos orchestrator. Also, the chaos prompt generator may rely on a chaos annotation and a chaos taxonomy process (numeral 216) to annotate and label the one or more chaos prompts, as well as to ensure that the chaos prompts include taxonomy appropriate for chaos engineering objectives and constraints.

The large language model may generate documents, as output, based on the chaos prompts it answers or acts on. The large language model may generate a test policy (numeral 222), an application chaos template (numeral 224), and a workload chaos template (numeral 226). The contents of the test policy, the application chaos template, and the workload chaos template may resemble contents of test policy 160, application chaos template 162, and workload chaos template 164 in system 100 throughout the lifetime of system 100.

The large language model may generate one or more chaos bots (numeral 228). The one or more chaos bots may be in the form of documents containing one or more chaos experiments to recommend for the chaos orchestrator to process and inject. The one or more chaos bots may recommend one or more chaos experiments depending on how the contents of the one or more chaos bots compares with the application's state prior to the preceding chaos experiment. The recommendation may also be based off of a comparison between the state of the application prior to the preceding chaos experiment and the contents of the test policy, the application chaos template, and the workload chaos template. The large language model may automatically perform comparisons of documents to determine whether to have one or more chaos bots recommend one or more chaos experiments for the chaos orchestrator. The chaos orchestrator may be modified based on the one or more recommended chaos experiments provided by the chaos bot.

The large language model, by means of similar comparison processes it may employ for determining contents and recommendations of the one or more chaos bots, may develop documents and/or code and/or other software mechanisms to patch the application and its components (numeral 232). Whether patching is required may depend on differences the large language model finds between its generated documents and the state of the application prior to the preceding chaos experiment. Patches may be applied when an operator of method 200 queries or trains the large language model to apply patches whenever there is a certain amount of a difference between generated contents of the large language model and the contents of the application which existed prior to the preceding chaos experiment.

Method 200 may be automated. Method 200 may be automated to the extent it repeats itself anytime a new recommended chaos experiment is implemented and/or anytime a new patch is applied to the application.

Figure 3:
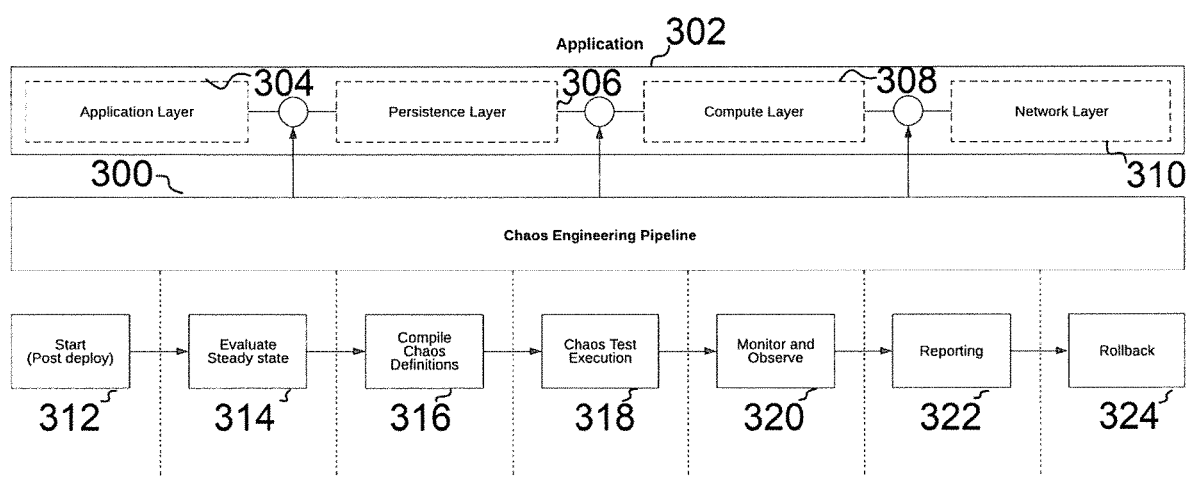
FIG. 3 illustrates an example of a chaos engineering pipeline.

Referring to FIG. 3, there is shown an example of a chaos engineering pipeline 300. Chaos engineering pipeline 300 may inject its artifacts into an application 302. Application 302 may have one or more layers. Application 302 may have an application layer 304, a persistence layer 306, a compute layer 308, and a network layer 310. Application layer 304 may include components or code similar to application layer 112 in FIG. 1. Persistence layer 306 may include components or code similar to persistence layer 114 in FIG. 1. Compute layer 308 may include components or code similar to compute layer 116 in FIG. 1. Network layer 310 may include components or code similar to network layer 118 in FIG. 1.

Chaos engineering pipeline may use API 138 in FIG. 1 of chaos engine 122 (also in FIG. 1) to inject chaos at different layers. During injection, chaos engineering pipeline 300 may, through API 138 and any other additional API (not shown), perform steps to execute injection, monitor chaos injected into application 302, and report on the results of the chaos. For instance, chaos engineering pipeline 300 may have tasks or processes that are initiated after deployment of a chaos experiment under a start phase (or post deploy phase) 312. Following this phase, an "Evaluate Steady state" phase 314, in which a process of assessing normal operating conditions of application 302, may occur.

"Evaluate Steady state" phase 314 may include simulating and analyzing application 302 under normal conditions, without any disruptions or faults. Evaluating the steady state is crucial as it serves as a baseline or control state against which changes or disruptions can be measured.

Following "Evaluate Steady state" phase 314, chaos engineering pipeline 300 may compile chaos definitions (marked as stage 316). This may refer to a process of gathering and organizing various chaos experiments, disruptions, or faults that would be introduced into application 302. Chaos experiments, disruptions, or faults may be generated from a chaos engine similar to chaos engine 122 shown in FIG. 1. Some of the definitions may include details about the type of disruption (e.g., a network delay, a server crash, etc.), the components of application 302 that ought to be affected, the duration of the disruption, and the expected behavior or outcome. Compiling these definitions is a crucial step in chaos engineering as it helps in planning and executing chaos experiments in a systematic and controlled manner.

A stage known as Chaos Test Execution 318 may follow stage 316. Chaos Test Execution 318 may include initiating or executing the chaos experiment which has been injected into application 302. Following execution, a Monitor and Observe stage 320 may follow, in which application 302 is monitored and observed. Monitor and Observe stage 320 may include extracting information about the behavior of application 302 during and after the course of the chaos experiment. Following the end of the chaos experiment, a Reporting stage 322 may begin compiling and reporting on the state of application 302. Reporting stage 322 may include deriving a resilience score based on application's 302 behavior during the chaos experiment. Reporting stage 322 may also compare the resilience score with a template score, or a score obtained during a previous chaos experiment. Reporting stage 322 may develop a report that is readable by large language model 158 or the large language model shown in FIG. 2.

Following Reporting stage 322, a process for Rollback 324 may initiate. Rollback 324 may include automatically triggering a rollback if the chaos experiment results in a failure of application 302. Rollback 324 may undo changed made prior to start phase 312. Rollback 324 may include the process of executing deployed instances being returned to the state application 302 was in before start phase 312 once rollback completes. Rollback 324 may be configured to minimize the impact of a failed chaos experiment on application 302.

Referring to FIG. 4, there is shown an example of an application profile 400. Application profile 108 in FIG. 1 may resemble application profile 400. Application profile 108 may contain same or similar contents of application profile 400. Application profile 400 may also contain additional pieces of information in the form of code and/or text. Application profile 400 may be a document containing text. For instance, application profile 400 may contain information concerning an application identity (e.g., application_id); a title of the application profile (e.g., customerhub); a date of creation/modification; a business label (e.g., line_of_business); an owner of application profile 400 (e.g., John Doe); whether application profile 400 has an architecture for serving multiple users (e.g., multi-tenant); encryption type (e.g., advanced encryption standard, or aes); level of confidentiality; level of integrity (e.g., level of consistency, accuracy, and trustworthiness of data as operational, important, or critical); level of availability (e.g., operationally needed, importantly needed, or critically needed); business criticality level; whether application profile 400 is externally facing (e.g., whether the application profile is exposed to users, systems, or services outside of a local network or system of concern); whether application profile 400 contains personal health information ("PHI"); whether application profile 400 contains personally identifiable information ("PII"); what compliance regimes or objectives application profile 400 must meet (e.g., General Data Protection Regulation, Health Insurance Portability and Accountability Act; Payment Card Industry Data Security Standard; etc.); and what base chaos experiments are to be performed on application profile 400 (e.g., latency injection, service restart, delayed job processing, traffic spikes, and database failures).

Referring to FIG. 5, there is shown an example of a workload context 500. Workload context 110 in FIG. 1 may resemble workload context 500. Workload context 110 may contain same or similar contents as workload context 500. Workload context 500 may also contain additional information in the form of code and/or text. Workload context 500 may be a document containing text. For instance, workload context 500 may contain information concerning an application identity (e.g., application_id); the importance of a service level agreement ("SLA"); platform type (e.g., linux or windows); platform version (e.g., ubuntu); workload type (e.g., virtual machine, container workload, or serverless computing platform); what system image (e.g., a serialized copy of the entire state of a system stored in some non-volatile form) is within workload context 500 (e.g., amazonlinux docker image); architecture information (e.g., 64-bit processor); frequency of deployment (e.g., daily, weekly, monthly, or yearly); what type of cloud environment workload context 500 is in (e.g., amazon web services, azure, google cloud platform, etc.); what type of deployment platform workload context 500 will interact with (e.g., Amazon Elastic Kubernetes Service; Amazon Elastic Container Service; Amazon Web Services Lambda; or other conventional server); what target services (e.g., specific services that a strategy, action, or tool is aimed at) are involved with workload context 500 (e.g., Amazon Simple Storage Service, Amazon Elastic Compute Cloud, Amazon Relational Database Service, Amazon Elastic Kubernetes Service, Amazon Web Services Lambda, Amazon API Gateway, etc.); what resources may be included in workload context 500 (e.g., the number of central processing unit cores available, or the amount of random access memory allocated); and what base chaos experiments are to be performed on workload context 500 (e.g., network failure, domain name system disruption, storage failure, sidecar disruption, resource exhaustion, etc.).

Figure 6:
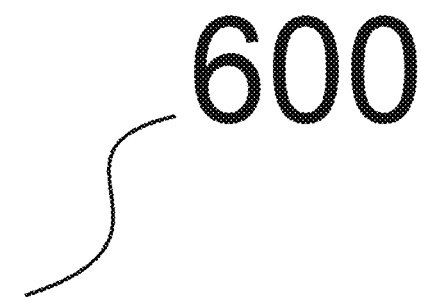
FIG. 6 illustrates an example of a workload context.

Referring to FIG. 6, there is shown an example of a software template 600. Software template 106 in FIG. 1 may resemble software template 600. Software template 106 may contain same or similar contents as software template 600. Software template 600 may be a document containing text. For instance, software template 600 may contain information concerning an application identity (e.g., application_id); programming language (e.g., python); version number; type of software framework (e.g., Flask); where assets are stored (e.g., ./assets as a path to an assets directory); which file lists dependencies (e.g., dependency_file: requirements.txt); type of software (e.g., backend or frontend); what type of API is included (e.g., Representational State Transfer, GraphQL, or gRPC); desired or required availability for a system or service; access permissions for different components of a system (e.g., access_type); accepted data formats; and what base chaos experiments are to be performed on software template 600 (e.g., memory leaks, a dependency failure, exception throwing, request manipulation, and file system errors).

Referring to FIG. 7, there is shown an example of a chaos experiment 700. Chaos experiment 700 may be one of many chaos experiments developed and/or executed and/or injected in system 100. Chaos experiment 700 may also be one of many chaos experiments developed and/or executed and/or injected in method 200. Chaos experiment 700 may include text which is readable by prompt template composer 142 and/or large language model 158 or the large language model shown in FIG. 2. Chaos experiment 700 may be a resulting product of chaos engine 122 and/or the chaos orchestrator of method 200. Chaos experiment 700 may have text containing a title and a description. Chaos experiment 700 may include a variable (e.g., "steady-state-theory") defined with one or more JSON objects. The one or more JSON objects of chaos experiment 700 may include information about its/their type, a name for an action or a healthcheck performance, a command that is executed when an action or a healthcheck performance is concluded, amount of delay for a JSON object to start, and a timeout quantity (e.g., in seconds) to stop an operation or function if it doesn't complete (e.g., "timeout"). Chaos experiment 700 may also include a "rollbacks" component (e.g., as a JSON object), which may include a reference to a specific state or configuration that is considered stable, a trigger (e.g., triggered on a failure), a name for a rollback action, or a command that will be executed when a rollback is triggered. Chaos experiment 700 may also have one or more tags to categorize or label items.

Referring to FIG. 8, there is shown an example of a chaos report 800. Chaos report 800 may be one of many chaos reports developed in system 100 and/or in method 200. Chaos report 800 may have text which is readable by prompt template composer 142 and/or large language model 158 and/or the large language model shown in FIG. 2 and/or the chaos prompt generator shown in FIG. 2. Chaos report 800 may be a resulting product of chaos engine 122 and/or the chaos orchestrator of method 200. Chaos report 800 may have text containing an identification number, a title, and an owner's name. Chaos report 800 may include information on whether the status of an associated chaos experiment is complete (e.g., the chaos experiment may complete or may be halted before its conclusion). Chaos report 800 may include a reliability score, a key with a value (e.g., "deviated": false may represent that no deviation occurred in the associated chaos experiment), results (e.g., whether commands were executed successfully), whether any rollbacks occurred during or after the associated chaos experiment (e.g., "rollbacks": false), where a task or process was executed from (e.g., "executed_from"), a duration for a task/process, when a task/process was completed, and whether there is compliance with one or more compliance regimes.

Figure 9:
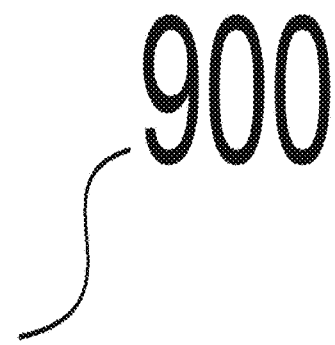
FIG. 9 illustrates an example of an application chaos template.

Referring to FIG. 9, there is shown an example of an application chaos template 900. Application chaos template 900 may be one of many application chaos templates developed in system 100 and/or in method 200. Application chaos template 162 may resemble application chaos template 900. Application chaos template 162 may contain same or similar contents as application chaos template 900. Application chaos template 900 may be a document containing text. For instance, application chaos template 900 may include names of objectives, the objectives themselves, and a sequence of prompts. The prompts may be used in recommending another chaos experiment. The prompts may be used to establish chaos engineering parameters. Application chaos template 900 may be modified in subsequent iterations in a system resembling system 100 or in a method resembling method 200. Each iteration may generate new sequences for application chaos template 900.

Figure 10:
FIG. 10 illustrates an example of a workload chaos template.

Referring to FIG. 10, there is shown an example of a workload chaos template 1000. Workload chaos template 1000 may be one of many workload chaos templates developed in system 100 and/or in method 200. Workload chaos template 164 may resemble application chaos template 900. Application chaos template 164 may contain same or similar contents as workload chaos template 1000. Workload chaos template 1000 may be a document containing text. For instance, workload chaos template 1000 may include names of objectives, the objectives themselves, and a sequence of prompts. The prompts may be used in recommending another chaos experiment. The prompts may be used to establish chaos engineering parameters. Workload chaos template 1000 may be modified in subsequent iterations in a system resembling system 100 or in a method resembling method 200. Each iteration may generate new sequences for workload chaos template 1000.

GENERAL

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A system for automatically generating and conducting a chaos experiment in distributed applications, the system comprising:
   a processor;
   a memory;
   a software application comprising a layer and a chaos configuration,
   wherein the chaos configuration comprises application information;
   a chaos engine comprising a chaos orchestrator,
   wherein the chaos engine is configured to
      generate the chaos experiment,
      receive the application information, read the application information,
inject the chaos experiment into the software application,
obtain results of the chaos experiment, and
generate a report of the results of the chaos experiment;
a chaos prompt generator comprising a prompt template composer,
wherein the chaos prompt generator is configured to
read the report of the results of the chaos experiment, and
compose a chaos prompt;
a chaos engineering large language model,
wherein the chaos engineering large language model is configured to exchange queries and trainings via the chaos prompt,
wherein the chaos engineering large language model is further configured to generate a chaos bot,
wherein the chaos bot is configured to recommend an additional chaos experiment to the chaos engine, and
wherein the chaos bot is further configured to patch the chaos configuration.

2. The system of claim 1, wherein the software application further comprises an application profile, a software template, and a workload context.

3. The system of claim 1, wherein the chaos engine further comprises a chaos configuration composer configured to compose an updated chaos configuration based on a recommendation provided by the chaos bot.

4. The system of claim 1, wherein the chaos engine further comprises an application programming interface configured to receive modifications of the chaos orchestrator and send a summary of a result of the modification.

5. The system of claim 1, wherein the chaos engine further comprises a reliability rating generator configured to generate a reliability rating of the software application.

6. The system of claim 1, wherein the chaos engine further comprises a rollback controller and an alert manager.

7. The system of claim 1, wherein the chaos prompt generator further comprises a prompt generation pipeline configured to test and generate the chaos prompt.

8. The system of claim 1, wherein the chaos prompt generator further comprises a chaos prompt template configured to be modified by the prompt template composer.

9. The system of claim 1, wherein the chaos prompt generator further comprises a chaos data annotator configured to annotate the report of the results of the chaos experiment.

10. The system of claim 1, wherein the chaos engineering large language model is configured to generate a test policy, an application chaos template, and a workload chaos template.

11. A method for automatically generating and conducting a chaos experiment in distributed applications, the method comprising:
providing an application comprising at least one layer and a chaos configuration,
wherein the chaos configuration comprises application information,
providing a chaos orchestrator,
providing a chaos prompt generator,
providing a chaos engineering large language model configured to generate a chaos bot,
starting the first chaos experiment for the application,
exchanging the chaos configuration with the chaos engine,
creating the chaos experiment via the chaos orchestrator,
injecting the chaos experiment into the application,
exchanging results of the chaos experiment with the chaos prompt generator,
generating one or more chaos prompts;
querying and training the chaos engineering large language model with the one or more chaos prompts,
developing a second chaos experiment from the chaos engineering large language model and writing the second chaos experiment into at least one or more chaos bots;
recommending the second chaos experiment in the chaos orchestrator; and
patching the software application via the chaos bot.

12. The method of claim 11, further comprising providing, within the application, a software chaos configuration, an application chaos configuration, and a workload chaos configuration.

13. The method of claim 11, further comprising providing a chaos template repository configured to store a premade chaos prompt and a chaos prompt generated by the chaos prompt generator.

14. The system of claim 11, further comprising annotating the one or more chaos prompts.

15. The system of claim 11, further comprising modifying the chaos orchestrator based on a recommended chaos experiment provided by the chaos bot.

16. The system of claim 11, further comprising generating a reliability score.

17. The system of claim 11, further comprising generating a test policy, an application chaos template, and a workload chaos template.

* * * * *